US008286092B2

(12) United States Patent
Hintermeister et al.

(10) Patent No.: US 8,286,092 B2
(45) Date of Patent: Oct. 9, 2012

(54) GOAL BASED USER INTERFACE FOR MANAGING BUSINESS SOLUTIONS IN AN ON DEMAND ENVIRONMENT

(75) Inventors: Gregory R. Hintermeister, Rochester, MN (US); Timothy J. O'Keefe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2619 days.

(21) Appl. No.: 10/965,187

(22) Filed: Oct. 14, 2004

(65) Prior Publication Data
US 2006/0085790 A1    Apr. 20, 2006

(51) Int. Cl.
*G06F 3/048*    (2006.01)
*G06F 9/46*    (2006.01)
*G06F 19/00*    (2011.01)

(52) U.S. Cl. ........ 715/804; 715/712; 715/713; 700/100; 718/100

(58) Field of Classification Search ................ 715/709, 715/712, 713, 804; 700/100, 101
See application file for complete search history.

(56) References Cited

U.S. PATENT DOCUMENTS 6,889,101 B1 * 5/2005 Gudmundsson et al. ....... 700/97
2002/0054142 A1 * 5/2002 Williams et al. ............... 345/804
2005/0251747 A1 * 11/2005 Dolling et al. ................ 715/713
2006/0004618 A1 * 1/2006 Brixius ............................ 705/8
2006/0069605 A1 * 3/2006 Hatoun ............................ 705/9

* cited by examiner

*Primary Examiner* — Robert Stevens
(74) *Attorney, Agent, or Firm* — Patterson & Sheridan LLP (57) ABSTRACT

Embodiments of the present invention generally provide a goal-based graphical user interface for managing business solutions and more particularly, a user interface that helps a user manage and achieve the user's goals across multiple platforms for the solutions utilized by the goals. Furthermore, embodiments of the invention provide a system for managing goals that allows a user to create/customize specific user goals and/or modify existing goals to meet the user's needs.

10 Claims, 9 Drawing Sheets

GOAL BASED USER INTERFACE FOR MANAGING BUSINESS SOLUTIONS IN AN ON DEMAND ENVIRONMENT

BACKGROUND OF THE INVENTION

1. Field of the Invention

The present invention generally relates to a user interface. More particularly, the present invention relates to a goal-based graphical user interface for managing business solutions.

2. Description of the Related Art

Current computer systems generally provide complicated environments for managing business solutions. A computer system may contain several separate computers, and each computer may contain many hardware and software components necessary for proper operation of the system. Each of these software and hardware components may perform a specific task. For instance, a computer may contain hardware components for storing and retrieving data, for accessing a network, and for creating a backup of system information, as well as numerous other hardware components. A computer may also contain software components for serving web pages, for monitoring the status of hardware components, for managing user permissions, and for managing a database, as well as numerous other software components. Thus, a computer system may contain an overwhelming number of hardware and software components performing an overwhelming number of tasks.

Each task being performed by a computer system may also be interrelated with other tasks being performed by the computer system. For instance, a web server software component used for serving web pages may retrieve information from a database manager software component. The database software component may access information stored on a storage drive hardware component. The web server software component may send the information provided by the database manager software component across a network using a network device hardware component. Thus, complicated relations may exist between each task on a computer system and each of the other tasks on that system.

The user of a computer system may not understand each task being performed by a computer system. Also, the user of a computer system may not understand how each task on a computer system is related to each other task on a computer system. Thus, if one component on the system fails, the user may not understand how to fix the component so that the component works. Also, if the component failure is caused by another system component's failure, the user may not understand the relationship between the components which causes both components to fail.

While the user may not understand each task being performed by a computer system, the user may have goals which the user would like the computer system to achieve. For instance, the user may want to use the computer system to install and run a business solution, such as an Internet business which serves web pages and takes customer orders. However, the user may not understand each task required for the computer system to run a given business solution. For instance, if a user wants to run an Internet business, the user may not understand that the computer system may need a network device to perform network communication tasks, a server to perform web page service tasks, and a database manager to perform information storage and retrieval tasks.

Current computer systems may try to alleviate user confusion regarding computer system components and the tasks they perform by providing graphical user interfaces (GUIs) for installing and managing the components on the computer system. Unfortunately, GUIs for installing and managing the components on the computer system typically provide the user with a deluge of information. GUIs for installing components typically list each component and each task which may be installed on the computer system. GUIs for managing components may list every component and every task being performed on a system. The listing of a large number of components and tasks in the GUIs may confuse a user who needs to install and manage only a few components to achieve the user's goal.

Within the GUIs, the components and tasks may be organized by topic, by product, in alphabetical order, or in some other manner. However, the components and tasks are not organized in a manner which shows the relationship of the various tasks for achieving a particular goal. Also, the organization of the components and tasks may be either unfamiliar to the user or unsuited to the user's specific goals. Thus, the user may have to search a large listing of components and tasks in the GUIs to find the specific components and tasks related to the user's goals. Furthermore, because the user may not understand the interrelation between each of the components and tasks on a system, the user may install and manage certain components and tasks without being aware of other related components and tasks which should also be installed and managed. For instance, while installing components and tasks on the computer system, the user may successfully use the GUI to install a network device and a server, but may fail to realize that a database manager also needs to be installed. Even if the user is sophisticated enough to understand each related component and task which needs to be installed, the user may still have to sift through the entire listing of components and tasks provided by the GUI to find the necessary components and tasks for installation.

While managing the computer system, the user may only wish to monitor the status of components and tasks related to the user's goal. However, the GUI for managing components and tasks may list the status of many unrelated components and tasks. For a user who does not understand the components and tasks related to the user's goal, the list may be overwhelming. Also, for the user who does not understand the interrelation between each of the components and tasks, the user may check the status of one component or task without being aware of the status of each of the related components and tasks that the user should be aware of. Again, even if the user is sophisticated enough to understand each related component and task which needs to be monitored, the user may still have to sift through the entire listing of components and tasks provided by the GUI to find the components and tasks to be monitored.

Thus, the user typically has difficulty understanding which components and tasks are related to the user's goals. If the user is able to actually understand which components and tasks are required, the user may still have difficulty finding the required components and tasks within the GUI. Ultimately, the user only really cares about accomplishing a goal using the computer system. Thus, the user would prefer that that the GUIs for installing and managing components and tasks list only the components and tasks related to the user's goal. The user would also like the ability to specify to the GUI what the user's goal is. Unfortunately, current GUIs do not provide this functionality. Accordingly, what is needed are GUIs for installing and managing components and tasks which list only the components and tasks related to the user's goal.

SUMMARY OF THE INVENTION

Embodiments of the present invention generally provide a goal-based graphical user interface for managing business solutions and more particularly, a user interface that helps a user manage and achieve the user's goals across multiple platforms for the solutions utilized by the goals. Furthermore, embodiments of the invention provide a system for managing goals that allows a user to create/customize specific user goals and/or modify existing goals to meet the user's needs. The system may provide pre-defined or pre-packaged goals which may be customized, and the system may be utilized with a third-party product or any intelligent software solution to create or customize specific goals.

One embodiment provides a computer readable medium containing code for displaying a user interface for managing one or more goals, the user interface comprising a first display section for displaying one or more selectable goal elements, each selectable goal element representing a goal and a second display section for displaying, upon selection of a selectable goal element, a plurality of building block elements for achieving a selected goal, the plurality of building block elements representing a plurality of tasks for achieving the selected goal.

Another embodiment provides a computer implemented method for managing one or more goals utilizing a user interface, comprising displaying, in a first display section, one or more selectable goal elements, each selectable goal element representing a goal, and upon selection of a selectable goal element, displaying, in a second display section, a plurality of building block elements for achieving a selected goal, the plurality of building block elements representing a plurality of tasks for achieving the selected goal.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide a goal-based graphical user interface for managing business solutions and more particularly, a user interface that helps a user manage and achieve the user's goals across multiple platforms for the solutions utilized by the goals. Furthermore, embodiments of the invention provide a system for managing goals that allows a user to create/customize specific user goals and/or modify existing goals to meet the user's needs. Also, embodiments of the invention also enable a user to achieve the user's goals regardless of the solution utilized on each platform.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software and web services that implement, some or all of the methods described herein. Aspects of these embodiments may also include analyzing the client's operations, creating recommendations responsive to the analysis, generating software to implement portions of the recommendations, integrating the software into existing processes and infrastructure, metering use of the systems, allocating expenses to users of the systems, and billing for use of the systems.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Further, in the following, reference is made to embodiments of the invention. The invention is not, however, limited to specific described embodiments. Instead, any combination of the following features and elements, whether related to different embodiments or not, is contemplated to implement and practice the invention. Furthermore, in various embodiments the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Similarly, reference to "the invention" shall not be construed as a generalization of any inventive subject matter disclosed herein and shall not be considered to be an element or limitation of the appended claims, except where explicitly recited in a specific claim.

Figure 1:
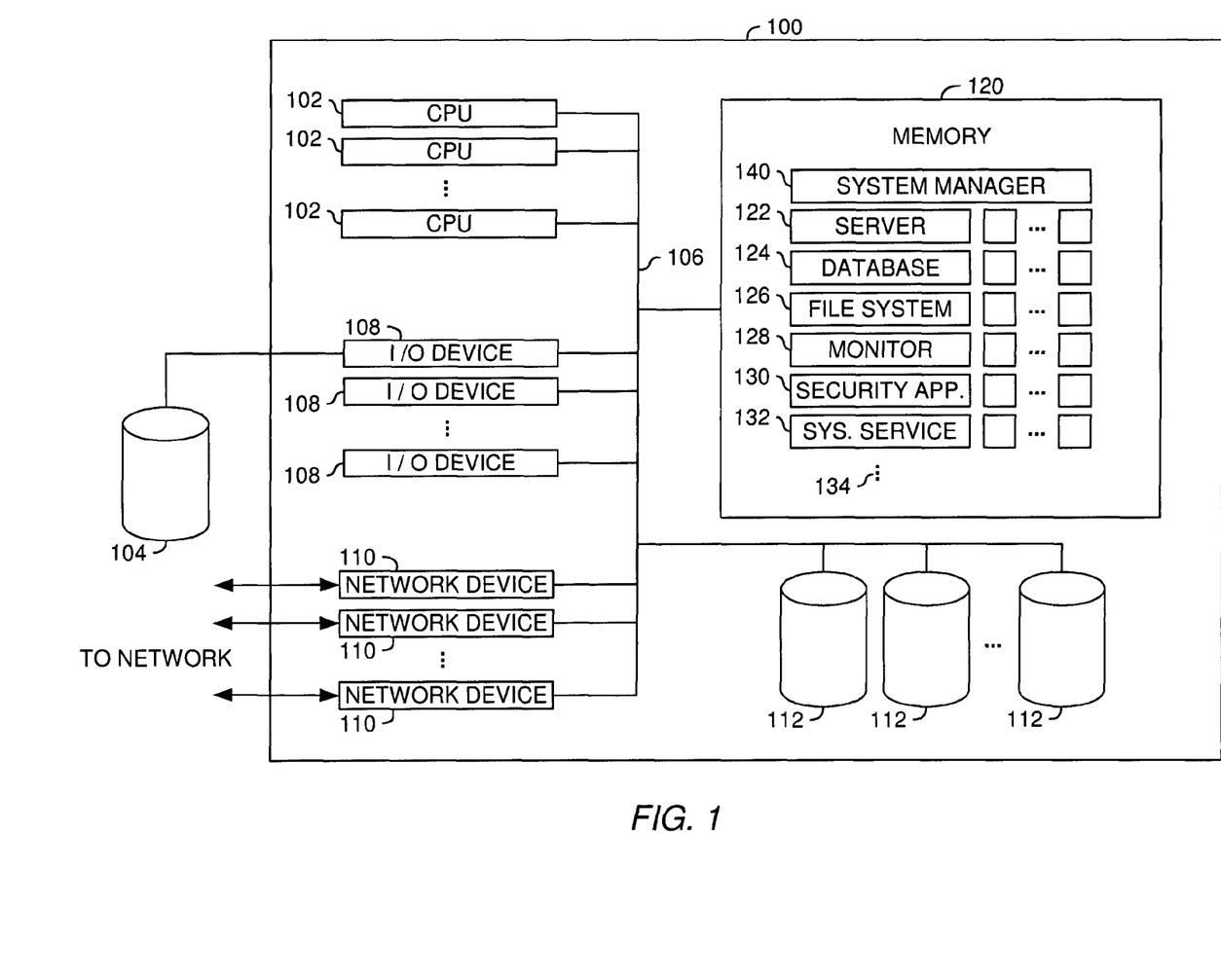
FIG. 1 is a block diagram illustrating an exemplary computer system in which embodiments of the present invention may be implemented.

FIG. 1 is a block diagram illustrating an exemplary computer system 100 in which embodiments of the present invention may be implemented. The computer system 100 may contain one or more central processing units (CPUs) 102 for executing programs, a memory 120 for holding programs and data, Input/Output (I/O) devices 108, network devices 110, and storage drives 112 for long term storage of programs and data. Each of the devices in the system may be connected by a system bus 106. The system may also have a backup device 104 connected to one of the I/O devices 108. The memory 120 typically holds a copy of the programs being executed by the system. The programs being executed by the computer system may include a system manager program 140 and one or more servers 122, database programs 124, file systems 126, system monitors 128, security applications 130, system services 132, and other programs 134.

Each of the hardware components and software components in the computer system 100 may perform a separate task for the system. A task may also be referred to as a building block when discussing the tasks, components, resources, and monitors used to accomplish a goal. As used below, a building block (or task) is anything which provides functionality for the computer system 100. As used herein, a task may include a hardware task and/or a software task. The term task may also encompass any information used by a task, just as the term program may encompass the data used by a program. Similarly, as used herein, a component is anything which provides functionality for the computer system and may include a hardware component or a software component. According to one embodiment of the invention, each task may be performed on the computer system 100. However, each task may also be performed by components on remotely located computer systems or by components running on different platforms. Examples of the tasks that hardware components may perform may include processing provided by CPUs 102, network input/output provided by network devices 110, and storage/retrieval provided by storage devices 112. Examples of tasks that software components may provide may include web page service provided servers 122, database access provided by database programs 124, and monitoring services provided by monitor programs 128. Tasks may also include applications generally, system services 132, third party software tools, common tasks run by a user, pre-defined custom tasks tailored to help achieve a goal, tasks for setting and changing configuration settings, notification tasks, autonomic tasks that can be deployed and reported on when they are active or need attention (such as intelligent agents, other automated activities), planning tasks (such as tasks for ordering, upgrading, or "On-Demand" usage), and any other tasks known to those skilled in the art.

As used herein, a goal may be defined as a broad objective that a user wants to achieve. According to one embodiment of the present invention, a goal may be defined by several tasks which provide functionality that may be needed in pursuing that goal. Thus, a goal definition may provide a user with all of the tasks related to achieving the goal. These tasks may include tasks used for installing other tasks related to the goal, tasks for monitoring the status of the goal, and tasks for performing actions required by a goal. For example, a user may have the goal of running a web business. Thus, the user's goal may have a task for installing a web server, a task for running the web server, and a task for monitoring the web server status.

Figure 2:
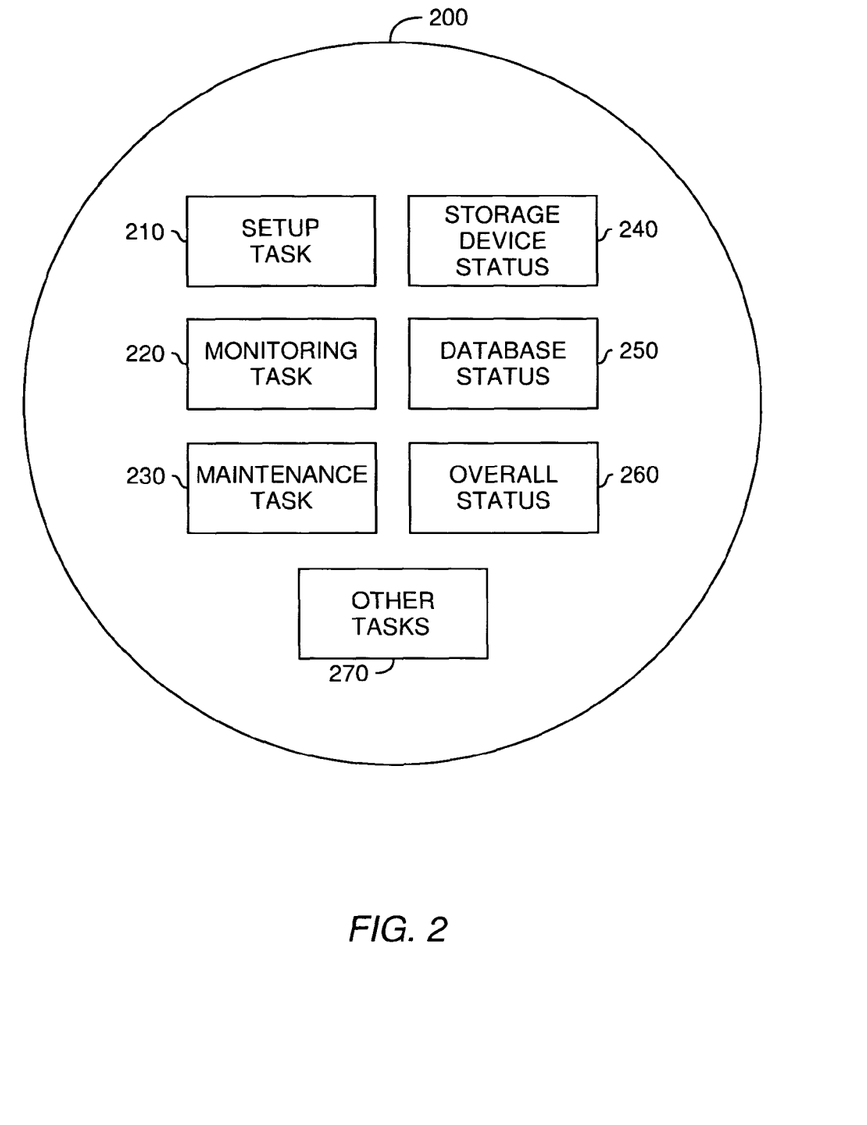
FIG. 2 is a block diagram illustrating an exemplary goal according to one embodiment of the invention.

FIG. 2 is a block diagram illustrating an exemplary goal according to one embodiment of the invention according to one embodiment of the invention. The goal 200 may be defined as having several different tasks which relate to the success or failure of achieving/maintaining the goal 200. The goal 200 may be defined by a setup task 210, a monitoring task 220 and a maintenance task 230 for the goal 200. The goal 200 may also include a task which monitors a storage device status 240, a database status 250 and the overall status of the goal 200. The goal 200 may also be defined by other tasks 270 to be pursued for the goal 200. Thus, the goal definition may provide a user with all of the information that the user needs to know about the goal 200, from installation of the components related to the goal 200, to maintenance of the goal 200, to monitoring of the goal 200.

The goal 200 may be stored as a data structure according to one embodiment of the present invention. The data structure may contain handles which point to each task related to the goal. As described above, the task may be mere information which relates to the goal, or the task may be computer code which provides functionality for running the task. When a new task is added to the goal, a new handle corresponding to the new task may also be added to the data structure for the goal. When information is requested about one of the tasks related to a goal, the data structure may be used to locate the handle corresponding to that task, and the handle to the task may be used to obtain information regarding the task.

According to another embodiment of the present invention, the goal 200 may be stored as a directory structure in a file system. For each task related to the goal 200, the directory may contain a file with a pointer to a program which is used to install, monitor, or perform the task. The pointer may be a link to a local file or program which contains data or performs actions related to a task, or the pointer may be a link to a remotely located file or program relating to the goal 200. The goal 200 may also be stored as a combination of a data structure and a directory structure according to one embodiment of the invention. For instance, some of the data regarding tasks related to the goal 200 may be stored as a data structure contained in a file within a directory corresponding to the goal 200. The goal 200 may also be stored in other ways known to those skilled in the art according to other embodiments of the invention.

The goal 200 may include one or more tasks that originate in another console (or platform) and/or application. Thus, according to an embodiment of the invention where the goal 200 is run by a console or application, the goal 200 may depend on a task being run from a separate console or application. The goal 200 may launch the separate console or application to perform the task to be run on the separate console or platform. The goal 200 may also depend on a status that originates from another console or application. Thus, the console or application for the goal 200 may obtain the required status from the other console or application and may consolidate the acquired status into one view and provide the ability to launch the other console or application if more detail is needed.

The task included in the goal 200 may originate from many different sources and may be performed without knowing about other related tasks. However, each task may be a key element which helps the goal 200 to succeed. Thus, the goal 200 may group the tasks together into one visual item so that the user can easily keep track of that goal. In another embodiment of the invention, tasks may be "intelligent agents" such that a task within the goal 200 may understand other tasks necessary for the goal 200 to succeed and may notify the user accordingly or automatically execute the other tasks.

According to one embodiment of the present invention, a user may define the goals which the user wishes to pursue. One embodiment of the invention provides an interactive wizard for creating a goal. While goals may be defined by users, goals may also be defined in other ways according to other embodiments of the invention. For instance, goals may be defined by a system developer according to one embodiment of the invention. The system developer may provide each user with only a definition of a goal while a third party provides the components that perform the tasks associated with the goal, or the system developer may provide the goal definition along with all of the associated components that perform tasks related to the goal. Thus, goals may be captured and sent across systems or defined by business partners, and goals may be professionally designed and sold to custom business environments.

Goals may also be defined differently for each user of the computer system 100. For instance, a first user may define a goal using a first selection of tasks that the user wishes to be performed, while a second user may define another goal using a second selection of tasks. Some of the tasks for the second user's goal may be the same tasks as some of the tasks for the first user's goal. For instance, the first user may be serving web pages using data stored in a database, while the second user may be tracking inventory using the same database. Thus, each user may include a task for monitoring the database in their respective goals, even though their goals are different. Along this line, users may also share goal definitions with each other according to one embodiment of the invention. For instance, the first user may define a custom goal and send the custom goal to the second user. The second user may then redefine portions of the custom goal according to the second user's particular needs.

Goals may be defined as having different types according to the objective of the goal. For instance, some goals may be defined as being action-driven. Such goals may be directed towards obtaining a specific objective. After obtaining the specific objective, the action-driven goal may be completed and may either terminate the tasks associated with the goal or may remain dormant or idle. Characteristics of an action-driven goal may also include that the goal may be linear in behavior, that the goal may require a number of tasks to be run to achieve the goal, and that the goal may have a concrete checklist of required tasks. Action-driven goals may be achieved or completed as soon as the required tasks have been performed. The goal may provide the user with tasks which provide information relating to the progress that has been made in achieving the goal. The goal may also provide the user with a checklist and the status of tasks which must be completed in order to achieve the goal. Thus, once each of the tasks has been completed, the objective of the action-driven goal has been achieved, and the user may be notified that the goal is achieved.

An example of an action-driven goal may be a goal of adding a new employee as a user in a network. The goal definition for adding a new employee may contain a task checklist of tasks to be performed. The task checklist may include tasks for creating a user profile for the new employee, creating user ID's for different applications the employee will be using, authorizing access to objects for the new employee, adding the employee to appropriate user groups, creating a personal web portal for the employee's daily work, and adding the employee to a personnel network for benefits, time cards, and other employee-related needs. The goal definition for adding the employee may provide information which allows the user to track the progress that is being made by each task. The goal definition may also alert the user adding the new employee of any problems encountered by any of the tasks on the task checklist and the user may also be notified when all of the tasks for adding a new employee have been successfully completed.

Some goals may also be defined as being monitoring-driven. Such goals may be ongoing, such that after the goal is initially set-up, the progress and health of the goal may be monitored to ensure that the goal is performing well. Characteristics of monitoring-driven goals may include that the goal may require initial set up tasks, that the goal may continually monitor the health of the tasks, that the goal may process events based on thresholds being exceeded, and that the goal may run trouble-shooting tasks to keep the goal active. In one embodiment, a monitoring-driven goal may be constructed with a variable checklist of tasks that need to be run, monitored, re-run and evaluated. Such monitoring-driven goal may never be completed, but may remain successfully active. For instance, the monitoring-driven goal may have defined thresholds for processing events, such as a system throughput threshold. The system throughput threshold may indicate a level at which the system 100 is unable to perform due to system limitations, and the system throughput threshold may be set for system throughput according to the amount of data that the system 100 can process. The user may be alerted if the status of the system throughput exceeds the threshold. Similar thresholds may also be created for action-driven goals and monitored until the objective of the action-driven goal has been achieved.

In addition to alerting the user to the trouble being encountered by the system 100, the goal definition may also provide the user with troubleshooting information, such as applications which may be run to troubleshoot any problems with the current goal. Thus, the goal definition may encapsulate all of the information a user needs to know with respect to maintaining the goal in a satisfactory manner. The goal may also be configured to automatically launch tasks which may run autonomously and solve any problems with the current goal or maintain the status of the goal. Thus, monitoring-driven goals may have tasks which perform system maintenance, such as ordering necessary system resources on demand. Thus, if a monitoring-driven goal has tasks which require more storage space, a maintenance task which monitors storage space for the goal may automatically order a storage device 112 which meets the needs for the goal's tasks.

An example of a monitoring-driven goal may be a goal of maintaining high security. The monitoring-driven goal may have tasks which both run and terminate after achieving a goal (run-to-completion tasks) and which run continually in order to continually monitor system components and provide system functionality. The goal definition may provide options which allow the user to schedule certain run-to-completion tasks which are periodically run to maintain system security. The run-to-completion tasks for a goal of maintaining high security may include tasks which modify system values pertaining to security, tasks which keep the network configuration up to date, tasks which are run to update programs relating to security, and tasks which create firewalls. The ongoing tasks for a goal of maintaining high security may include tasks which monitor the status of the firewall, tasks which monitor the network configuration, and tasks which log information and notify the user when a security threat is detected.

Another example of a monitoring driven goal may be a goal of tracking the status of a web storefront. A web storefront may be an online business being operated by the user which allows the user to take online orders for merchandise which the user sells. The goal definition for managing a web storefront may include tasks which monitor the response time of a web server 122, tasks which monitor application service logs, tasks which monitor overall system health, tasks which manage the system workload, tasks which maintain database access speed, tasks which verify that the storage devices 112 are running smoothly, and tasks which archive rarely used data. Thus, the goal definition for managing a web storefront may contain all of the tasks which the user needs to both monitor and maintain the user's goal of providing customers with a means for placing online orders.

To help the user understand the status of each goal, each goal may also be defined as having a lifecycle. The lifecycle may inform the user about the progress that the goal is making. Each goal may have a lifecycle which includes phases wherein the goal is dormant, working, needs attention, or is active/achieved. At the dormant stage, a goal may have no activity and may be an objective which a user would like to achieve in the future. In a working stage, the goal may be in the process of being achieved. Thus, during the working stage, setup tasks may be running and initializing. At the attention stage, one or more tasks required to achieve the goal or keep the goal active may have encountered problems or may have failed. Trouble-shooting may be required to correct the problem or failure. In the active/achieved stage, the tasks required for achieving an action-driven goal may be completed, and the tasks required for keeping a monitoring-driven goal active may be installed and configured and may be running successfully. Thus, information regarding the lifecycle of the goal may provide the user with a quick snapshot of how the goal is performing and whether the goal is making progress or needs attention before the goal may continue working.

According to one embodiment of the invention, goals may be displayed to the user using a system manager program 140 (also referred to as a console). Each goal may be displayed by a separate, specially designed program according to one embodiment of the invention. According to other embodiments of the invention, several goals may be displayed using a single program or several programs may be used to display a single goal. Also, a console for displaying a goal may provide other options and functionality in addition to displaying goals. For instance, the console may provide an option which allows the user to switch from a "goal view" which displays tasks according to the goals to which they pertain to a "resource view" which displays a complete list of all of the tasks being performed in the system 100 regardless of the goal.

Figure 3:
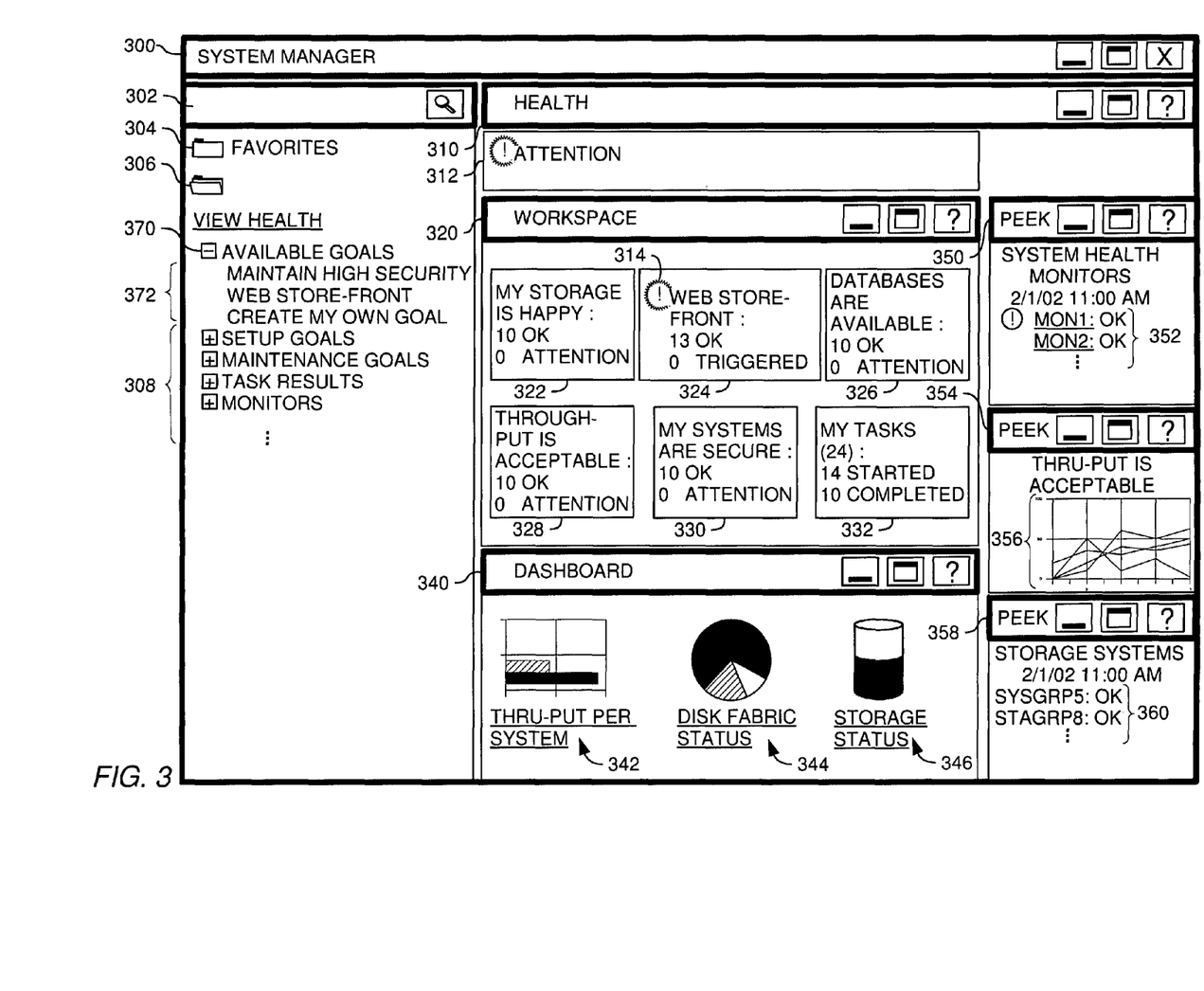
FIG. 3 depicts a GUI for displaying the goals for a computer system according to one embodiment of the invention.

The information regarding each goal may be displayed to the user through a graphical user interface 300, such as the GUI shown in FIG. 3. Although embodiments of the invention are described herein with respect to a graphical user interface having graphical elements, embodiments providing user interfaces in other forms, such as a text-based interface, are also contemplated. FIG. 3 depicts a GUI 300 for displaying the goals for a computer system 100 according to one embodiment of the invention. The GUI 300 may contain several different panes 302, 310, 320, 340, 350, 354, 358, each of which display the status of some aspect of the system 100. Each pane may be displayed, expanded, arranged, and minimized according to the interests and preferences of the user.

Panes may also be automatically displayed according to events taking place on the system 100. For instance, if a component within the system 100 fails, a pane may pop up that contains a notification regarding the failure. Panes may be arranged using separate non-overlapping frames, using a multiple document interface (MDI), using a single document interface (SDI), or using tabs. In general, the panes may be manipulated in any of the ways known to those skilled in the art.

The GUI 300 may contain a pane 302 which lists all of the task categories 308 in the system 100. Each of the task categories may placed in a folder such as a system manager folder 306. The pane 302 may also provide a Favorites folder 304. Each individual building block category may be expanded by pressing the "plus" image next to the building block category. For instance, the "Available goals" category 370 may be expanded to show the current available goals and other options 372 related to the available goals. The expanded category (such as the "Available goals" category 370) may later be collapsed by pressing the "minus" image next to the category name.

The GUI 300 may also have a workspace pane 320 which shows the status of each of the goals in the system 100 as icons 322, 324, 326, 328, 330, 332. For instance, the workspace pane 320 may contain an icon 322 for the status of the storage devices 112, an icon 324 for the status of a web storefront, an icon 326 for the status of the databases 124, an icon 328 for the status of the system through-put, an icon 330 for the status of system security, and an icon 332 for the status of various tasks being performed by the system 100.

The GUI 300 may also contain a dashboard pane 340 which displays graphical indicators 342, 344, 346 of the status of components performing tasks for the system 100. For instance, the dashboard pane 340 may contain a graphical indicator 342 for the status of the system throughput, a graphical indicator 344 for the status of the disk fabric, and a graphical indicator 346 for the status of the system storage. Each graphical indicator may be displayed in the form of a pictorial graph which allows the user to obtain an at-a-glance intuitive understanding of each of the components and related tasks being performed. The user may have the option of dragging and dropping tasks from the workspace pane 320 or from other parts of the UI 300 into the dashboard pane 340. The dashboard pane 340 may then display the status of each task which has been dragged and dropped. Thus, the dashboard pane 340 may allow the user to view key tasks from multiple goals in a single pane. The ability to view key tasks from multiple goals may further assist the user in quickly and efficiently managing each of the user's goals.

The GUI 300 may also contain panes 350, 354, 358 which allow the user to quickly view or "peek" into the status of specific tasks which the user is interested in. For instance, the GUI 300 may contain a "peek" pane 354 which shows the status 352 of the system monitors 128, a "peek" pane 354 which shows the status 356 of the system throughput as a graph, and a "peek" pane 358 which shows the status 360 of the system storage devices 112. Thus, a user may be provided with important task information for a goal without actually having to drill down into the details of the goal.

The GUI 300 may also contain a status pane 310 (labeled as "health") which shows the overall status of the system. For instance, if a task within a goal fails, the status pane 310 may show an alert icon 312 which shows that the goal needs attention. The GUI 300 may also display an alert icon 314 in the workspace pane 320 next to the goal icon 324 which needs attention. In FIG. 3, a problem may have arisen with the web storefront, and thus the status pane 310 may display an alert icon 312 and the workspace pane 320 may display another alert icon 314 next to the web storefront icon 324. If the system 100 is not experiencing any problems, the attention icons 312, 314 may be removed, and the status pane 310 may show that the system 100 is in good health.

Figure 4:
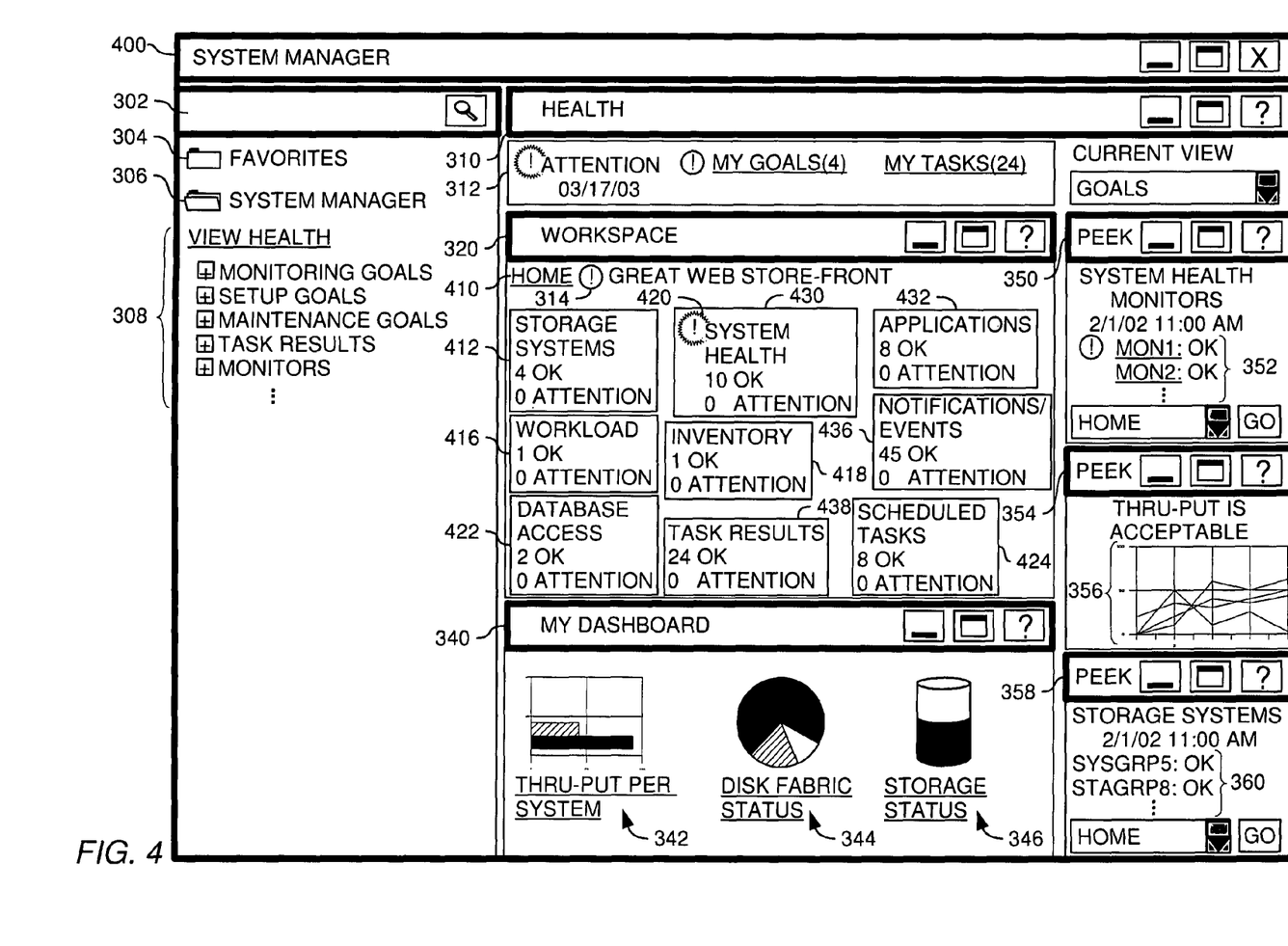
FIG. 4 depicts a GUI for displaying the building block categories related to a goal according to one embodiment of the invention.

According to one embodiment of the present invention, the user may select a goal icon (such as the goal icon 324) to "drill down" and see the task categories related to the goal. For instance, upon seeing the alert icon 314 next to the goal icon 324, the user may click the goal icon 324 and may be presented with a GUI 400 such as that shown in FIG. 4. FIG. 4 depicts a GUI 400 for displaying the building block categories related to a goal according to one embodiment of the invention. Each individual building block may be placed in a building block category to inform the user of the type of function that the building block is performing for the goal. However, at the same time, the user may be able to see specific details of specific building blocks being performed for the goal using the peek panes 350, 354, 358.

Each building block category may be displayed as an icon in the workspace pane 320. Because the user has drilled down into the details of the goal, the workspace pane 320 may show a breadcrumb view 410 (also referred to as a hierarchical view, path view, or trail view) of the user's position in the goal hierarchy. The building block category icons related to the management of the web storefront may include a building block category icon 412 for monitoring the storage devices 112, a building block category icon 430 for monitoring system health, a building block category icon 432 for monitoring applications, a building block category icon 416 for monitoring the system workload, a building block category icon 422 for monitoring database access, a building block category icon 436 for viewing notifications and events, a building block category icon 418 for monitoring inventory, a building block category icon 424 for viewing scheduled tasks, and a building block category icon 438 for viewing task results. By selecting one of the building block category icons, the user may be presented with details regarding specific tasks which are directly related to the current goal, in this instance, managing the web storefront. For instance, the "Task Results" category may contain all tasks that have run in support of the goal, all tasks that have been scheduled and all related tasks that can be used for trouble-shooting. Thus, by selecting the task results icon 438, the user may easily see which tasks have been run to keep the goal active and current.

As described above, the user may have selected the web storefront icon 324 after being notified that the web storefront goal needs attention by the alert icon 312. Upon clicking the web storefront icon 324, the user may view further details regarding the reason for the alert icon 312. According to the embodiment of the invention depicted in FIG. 4, the user may be presented with another alert icon 420 next to a specific building block category icon 430 which requires attention. Thus, the alert icon 420 depicted in FIG. 4 may inform the user that a task in the System Health building block category is experiencing problems.

Figure 5:
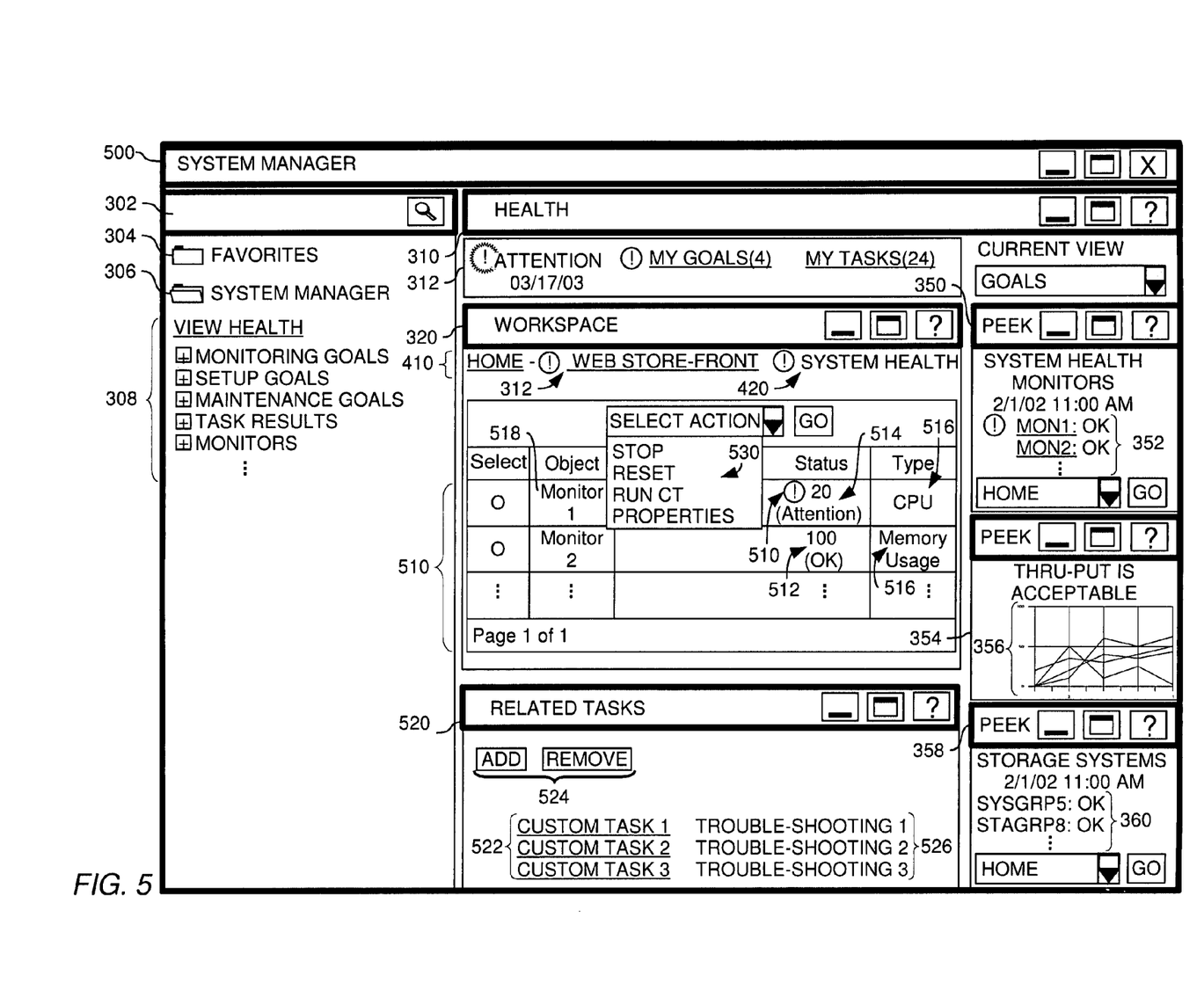
FIG. 5 depicts a GUI for displaying building blocks related to a goal according to one embodiment of the invention.

Upon being alerted by the alert icon 420 next to the System health icon 430, the user may select the System health icon 430 in order to drill down and view the specific tasks related to the system health. Upon clicking the System health icon 430, the user may be presented with a GUI 500 such as the one shown in FIG. 5. FIG. 5 depicts a GUI 500 for displaying a group of building blocks related to a goal according to one embodiment of the invention. The specific building blocks or tasks 510 may be displayed in the workspace pane 320. Because the user has drilled down further into the goal hierarchy, the breadcrumb view 410 may be updated to reflect the user's new position within the goal hierarchy. For each specific task 510, the workspace pane 320 may show the status 512, 514 of the task as well as a brief description 516 of what functions the task is performing. According to the embodiment of the invention depicted in FIG. 5, the tasks relating to system health may all be monitor programs 128, each of which may be monitoring some aspect of the system performance.

According to one embodiment of the present invention, the user may be alerted to the specific task 518 experiencing a problem by an alert icon 510 and a status message 514 displayed next to the specific task 518. In the case depicted in FIG. 5, a component within the system (e.g., System 20) may be experiencing a problem. Thus, the monitor 518 for System 20 may have raised an alert, causing the alert icon 510 to be displayed and causing the status message 514 to be changed to "Attention". The GUI 500 may also display a pane 520 showing tasks 522 related to the current tasks 510 being viewed in the workspace pane 320. The related tasks pane 520 may have a listing of custom tasks 522 and troubleshooting tasks 526 and buttons 524 for adding and removing related tasks. Thus, the related tasks pane 520 may provide the user with custom tasks 522 which may be used to address particular needs of a user and troubleshooting tasks 526 which may be used to troubleshoot the system task which is experiencing difficulties.

Figure 6:
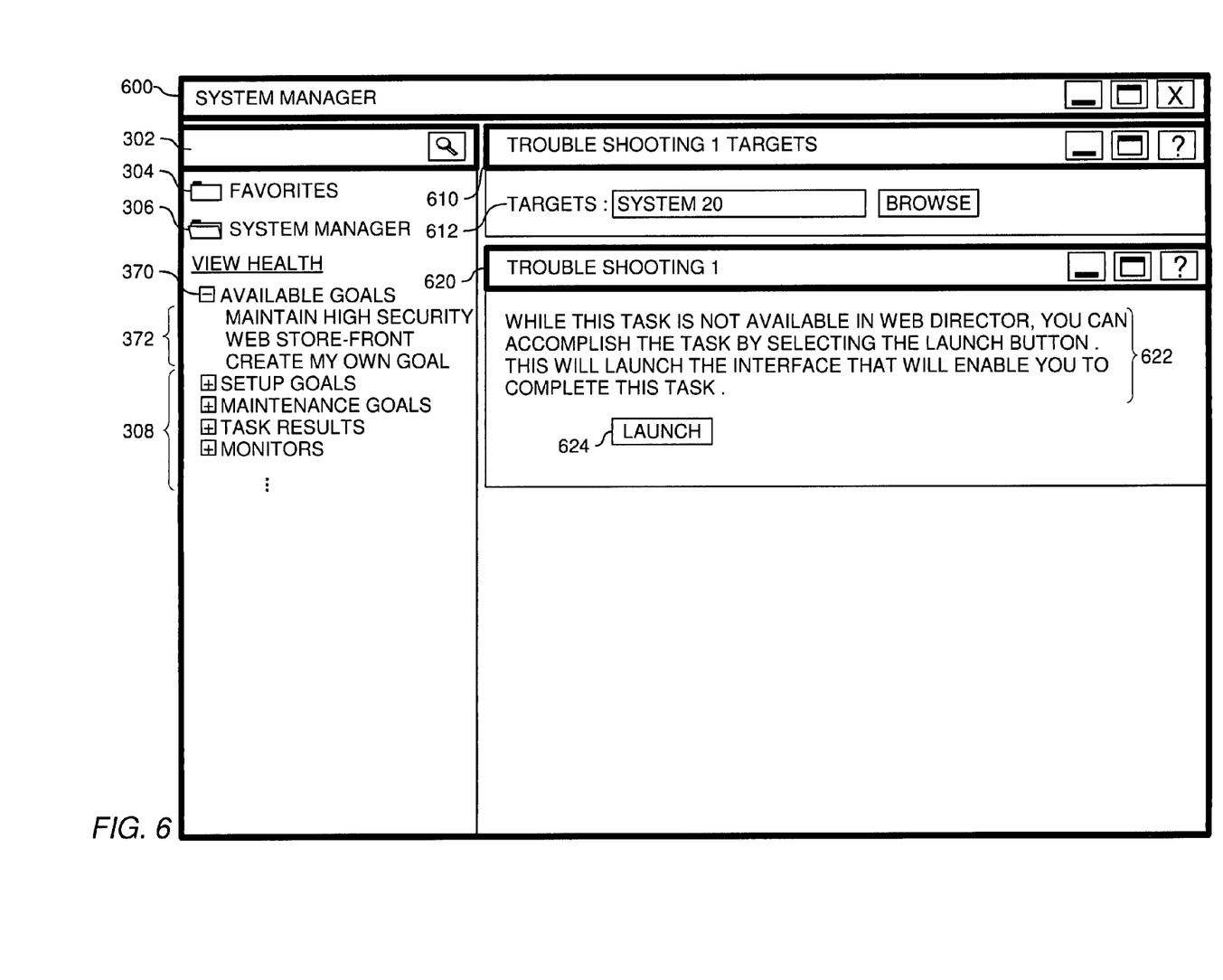
FIG. 6 depicts a GUI for displaying troubleshooting options according to one embodiment of the invention.

As an example, upon selecting one of the troubleshooting tasks 526, the user may be presented with a GUI 600 such as the one shown in FIG. 6. FIG. 6 depicts a GUI 600 for displaying troubleshooting options according to one embodiment of the invention. The GUI 600 may contain a pane 610 for selecting the target 612 of the troubleshooting task. The list of possible targets may be filtered based upon the targets pertinent to the affected goal. For instance, while the default target may be the task experiencing difficulties (e.g., System 20), the dropdown menu for the target 612 may provide a list of all of the targets which are working to achieve the goal. In the embodiment depicted in FIG. 6, the selected target 612 may be the system which is experiencing difficulty (e.g., System 20). In one embodiment, the selected targets may be filtered based on what targets are being affected by the goal, with a default target being a target experiencing difficulty. However, the dropdown may also show all targets that are working to achieve the goal. The GUI 600 may also provide a pane 620 with informative text 622 about the selected troubleshooting task and a button 624 for launching the selected task. Thus, in the depicted embodiment, the pane 620 may inform the user that the selected task cannot be executed using the current program, but that the user may launch the task by selecting the button 624. Upon selecting the button 624, the troubleshooting task may be executed, allowing the user to correct the malfunctioning task and return the goal to the regular "active" status.

Embodiments of the invention may also provide other means for troubleshooting a task. Upon selecting a troubleshooting task, the user may also be presented with a UI such as the UI 900 depicted in FIG. 9 (and described below in greater detail) which may allow the user to add resources to the system in order to troubleshoot the problem. The user may also be presented with a pop-up, a link to a troubleshooting web site, a troubleshooting tutorial, or any other feature known to those skilled in the art which may allow the user to troubleshoot a task.

Accordingly, the GUIs 300, 400, 500, and 600, by arranging the tasks according to the user's goals, have notified the user of problems with the goal, allowed the user to find out which aspect of the goal has been affected, helped the user find task which is hindering success of the goal, allowed the user to select an appropriate troubleshooting task, and helped the user return the goal back to the desired "active" status. Thus, when the user needs to troubleshoot a goal in trouble, the user may only need to select the goal to see which specific tasks related to the goal need attention, instead of having to search a list of all of the tasks being executed. The tasks used to troubleshoot the goal may already be grouped within the goal, so that the user does not have to sift through the entire list of troubleshooting tasks for the system 100. The user may also see which tasks have run in the past, as well as tasks that have been scheduled for maintenance reasons, and may thus understand the history of the goal as well as the future actions that the tasks within the goal will be performing.

Figure 7:
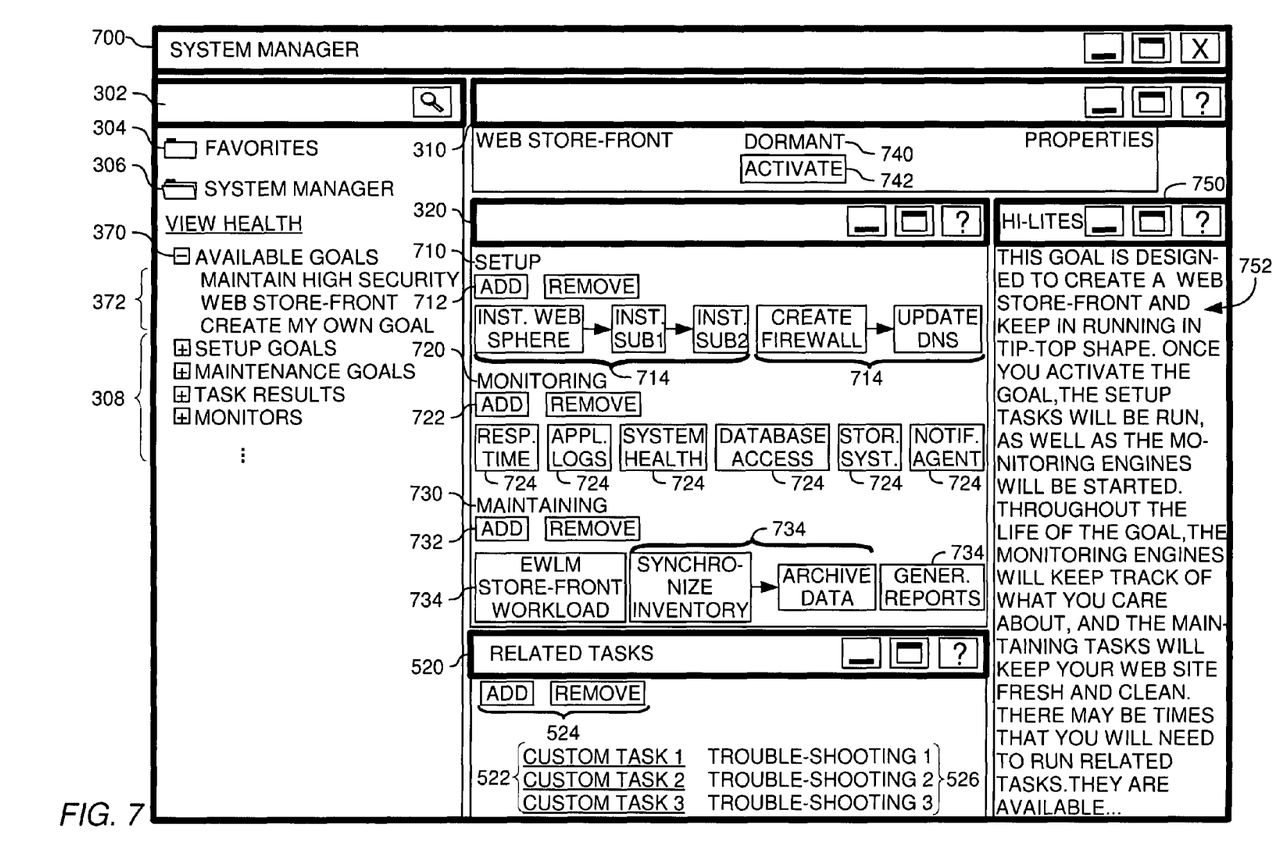
FIG. 7 depicts a GUI for displaying the building blocks used to initialize a goal according to one embodiment of the invention.

According to one embodiment of the invention, the goal definition may also include the tasks necessary to install the goal, configure the goal, and start the regular operation of the goal. FIG. 7 depicts a GUI 700 for displaying the building blocks used to initialize a goal according to one embodiment of the invention. The status pane 310 for a goal which has not been installed may show the status 740 of the goal as being dormant. The status pane 310 may also provide a button 742 for activating the goal. In addition to the status pane 310, the GUI 700 may provide a highlights pane 750 (marked "Hi-Lites") which provides a brief description 752 of the objective of the goal being installed. Also, as a goal is being viewed, the highlights pane 750 may automatically get updated to show aspects of the goal that are of particular interest. For instance, the highlights pane 750 may show how well the goal is being achieved, or show trouble spots that need the user's attention.

The GUI 700 may also provide an overview of the tasks necessary to initialize the goal. For instance, the workspace pane 320 may show a building block category 710 for setting up the goal, a building block category 720 for monitoring the goal, and a building block category 730 for maintaining the goal. Under each building block category 710, 720, 730 the GUI 700 may provide buttons 712, 722, 732, respectively, for adding and removing tasks to the category. Thus, a user may customize the tasks which are used to setup, monitor and maintain the goal according to the individual user's needs and preferences. Each building block category 710, 720, 730 may also list the current tasks 714, 724, 734, respectively, which are included with the category. The setup category 710 may include tasks groups 714 for installing a web management program (such as WebSphere™, developed by IBM™) and subcomponents of the web management program, task groups for installing a firewall and related components, and task groups for installing web profiles. The tasks may be placed in a group 714 according to dependencies between the tasks or according to the multistage nature of the tasks. The monitoring category 720 may contain task groups 724 for monitoring response time, making application logs, monitoring system health, monitoring database access, monitoring storage systems, and an agent for posting notifications. The maintaining category 730 may contain task groups 734 for maintaining workload management policies, for synchronizing inventory and archiving data, and for generating reports based on system performance. Thus, the GUI 700 may display all of the necessary tasks which will be initialized and run when the user selects the activate button 742 for activating the goal.

Figure 8:
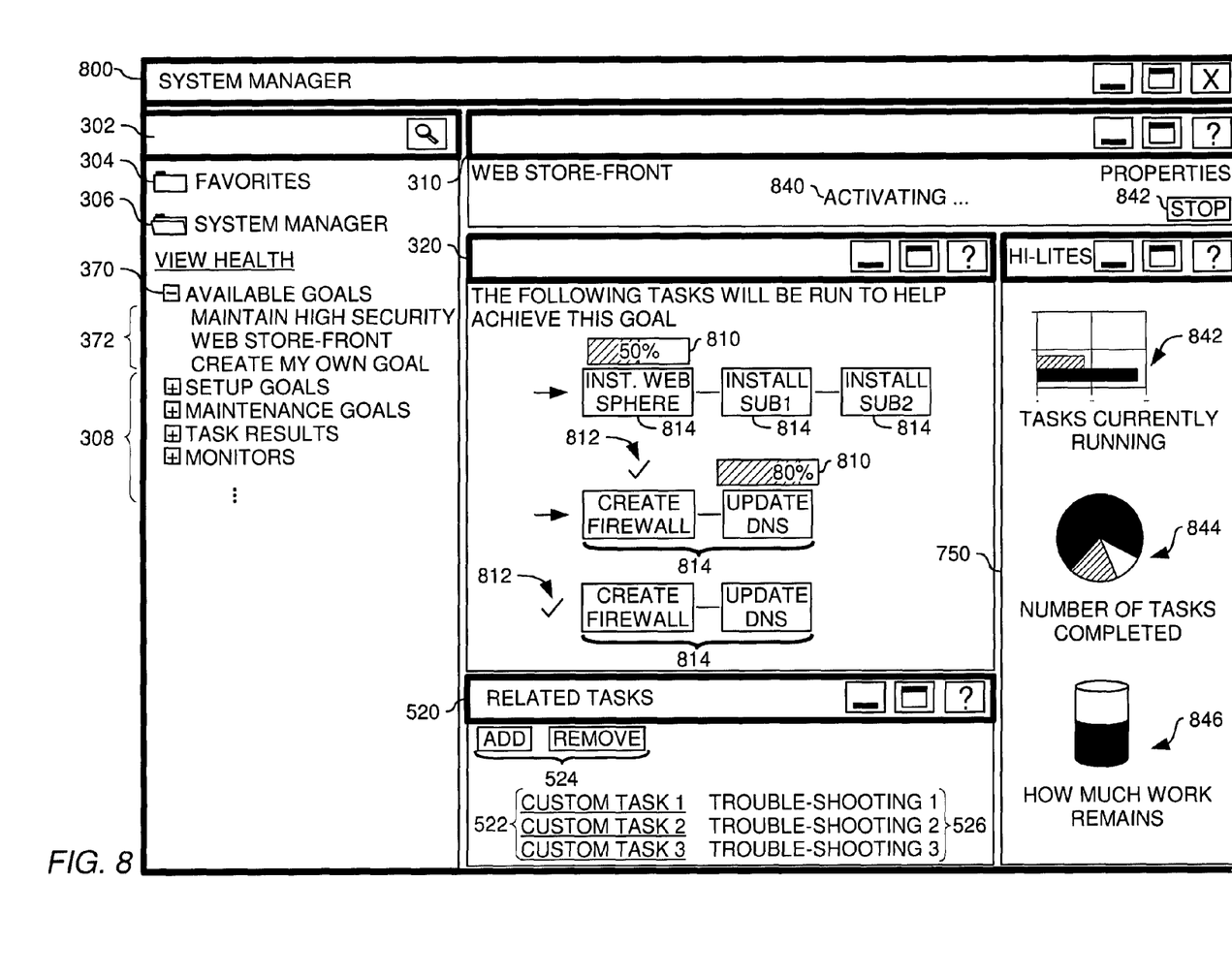
FIG. 8 depicts a GUI for displaying the progress of the initialization of a goal according to one embodiment of the invention.

Upon selecting the activate button 742, the user may be presented with a GUI 800 such as the one shown in FIG. 8. FIG. 8 depicts a GUI 800 for displaying the progress of the initialization of a goal according to one embodiment of the invention. The status pane 310 provided by the GUI 800 may reflect that the goal is being activated and may thus display an "activating" status message 840. The status pane 310 may also provide the user with a button 842 which allows the user to stop the activation of the goal in case the user decides not to activated the goal. The GUI 800 may also provide a listing within the workspace pane 320 of each task which is running in order to activate the goal. The tasks being run may be depicted as task icons 814. Each task icon 814 may have either a progress meter 810 which shows what percentage of the task has been successfully completed, or each task icon 814 may have a completion indicator 812 which indicates that the task associated with the icon has been run and completed successfully.

During the activation process, the highlights panel 750 may display the overall progress of initializing the selected goal. As shown, the highlights panel 750 may include a bar graph 842 for displaying the tasks currently running, a pie chart 844 for displaying the percentage/number of tasks completed, and a cylindrical (percentage-filled) chart 846 for displaying how much work remains. Thus, by glancing at the highlights panel 750, the user may be given an overview of the progress of initializing the goal.

Figure 9:
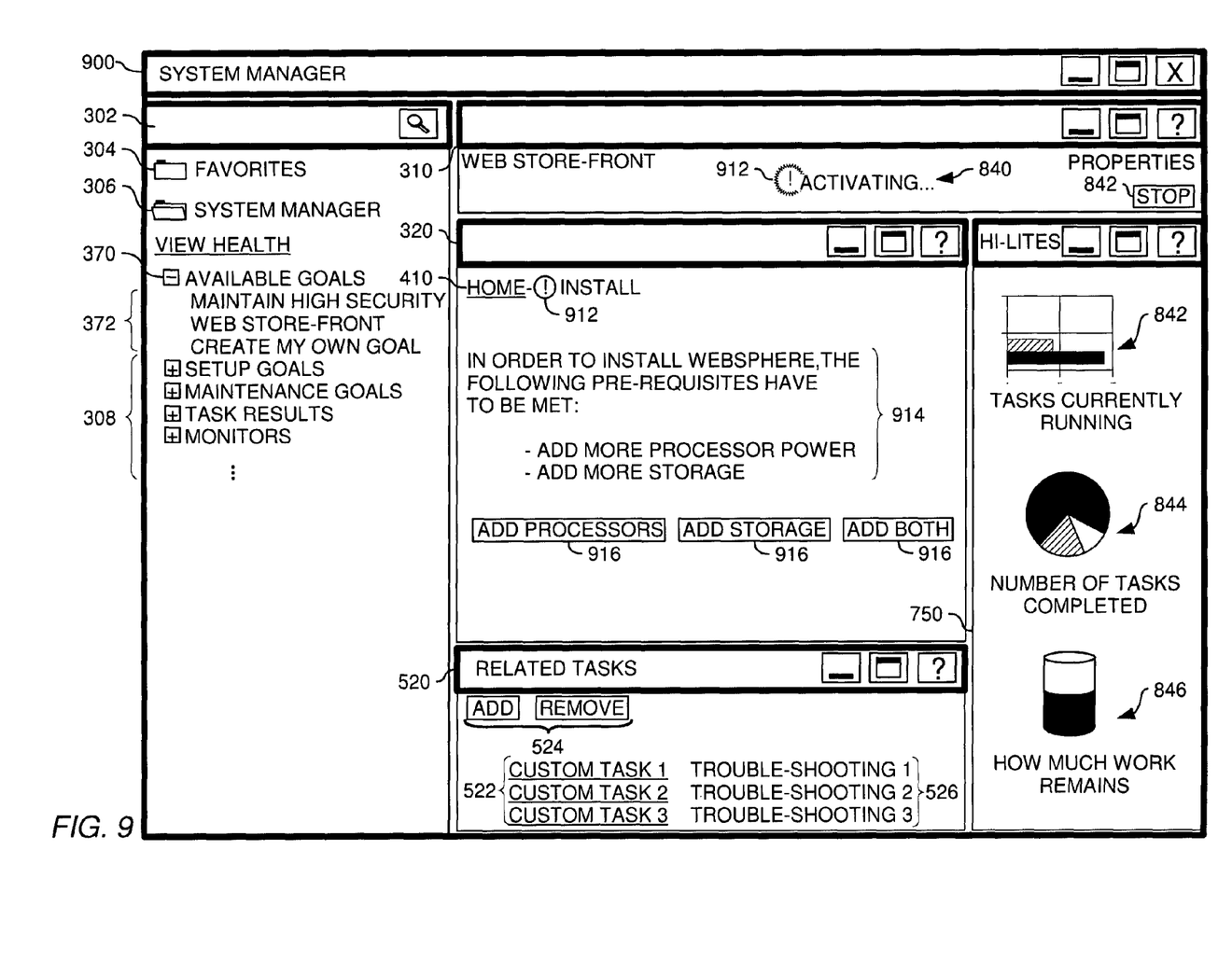
FIG. 9 depicts a GUI for displaying options for troubleshooting a goal initialization.

While initializing a goal, some tasks may encounter problems. For instance, some selected tasks 814 being run for the goal may be incompatible with other tasks being run on the system 100. Also, some selected tasks 814 may require extra resources which the system 100 cannot provide. To help the user overcome a failed installation, the goal definition may provide the user with a GUI 900 such as the one depicted in FIG. 9. FIG. 9 depicts a GUI 900 for displaying options for troubleshooting a goal initialization according to one embodiment of the invention. If the initialization process encounters a problem, an alert icon may be displayed next to the installation task which experienced the problem. Upon selecting the icon for the installation task experiencing the problem, the GUI 900 may be displayed. The status pane 310 in the GUI 900 may alert the user to the problem by displaying an alert icon 912 next to the status message 840. The workspace panel 320 may automatically change to reflect the change in the initialization status. The workspace pane 320 may show the alert icon 912 in the breadcrumb view 410 and may also provide a text message 914 which gives details regarding the reasons why initialization failed.

The workspace pane 320 may also provide buttons 916 which provide troubleshooting options. According to the exemplary embodiment of the invention depicted in FIG. 9, the text message 914 may inform the user that installing the web management program (WebSphere™) requires more processor power and more storage. The buttons 916 may include a button which will assist the user in adding new processors, a button which will assist the user in adding extra storage, and a button which will assist the user in adding both.

Thus, the GUIs 700, 800, 900 for initializing a goal may provide the user with numerous options which allow the user to customize which tasks will executed in initializing the goal, to view the overall progress of the initialization of the goal, and to troubleshoot any problems encountered in initializing the goal. Thus, the goal may define every related task which the user needs to initialize and troubleshoot the initialization of the goal. Accordingly, using the present invention, the user does not have to search a large listing of unrelated tasks to initialize and troubleshoot the initialization of the goal.

While the foregoing is directed to embodiments of the present invention, other and further embodiments of the invention may be devised without departing from the basic scope thereof, and the scope thereof is determined by the claims that follow.

What is claimed is:

1. A computer implemented method for managing one or more goals utilizing a user interface, comprising:
displaying, in the user interface, a plurality of selectable goal elements, each selectable goal element representing a user goal for managing a computer system;
upon selection of a selectable goal element,
displaying, in the user interface, a plurality of building block elements ordered in a predefined sequence of execution for achieving a goal represented by the selected selectable goal element, the plurality of building block elements representing a plurality of tasks for achieving the selected goal;
displaying a status indicator with each selectable goal element, each status indicator indicating a collective performance status of the plurality of tasks for achieving a respective goal; and
displaying a status text field along with each building block element, each status text field describing a function currently being performed by the building block element, wherein the status text field displays a textual indicator of whether the building block element is functioning correctly or requires attention.

2. The method of claim 1, further comprising:
displaying, in one or more status panes, one or more statuses of one or more selected tasks, wherein each status is selectable to further display details of the respective task and status.

3. The method of claim 2, wherein at least one of the status panes provides a graphical representation of the respective status.

4. The method of claim 1, wherein the plurality of tasks are selected from setup tasks, monitoring tasks and maintenance tasks.

5. The method of claim 1, wherein the plurality of tasks includes one or more tasks performed in one or more other applications.

6. The method of claim 1, wherein the plurality of tasks includes one or more tasks performed in one or more other applications run on one or more different platforms.

7. The method of claim 1, further comprising:
displaying, in a category pane, a plurality of expandable categories, wherein each expandable category, upon selection, displays additional selectable sub-categories, wherein the plurality of expandable categories include an available goals category having one or more pre-packaged goals as selectable sub-categories and a goal creation selectable sub-category, and wherein upon selection of a respective selectable sub-category under the available goals category, a respective plurality of tasks to be installed for the selected sub-category is displayed in the user interface.

8. The method of claim 7, wherein, upon selection of one of the pre-packaged goals under the available goals category, the user interface displays at least one of one or more setup tasks, one or more monitoring tasks and one or more maintaining tasks which are to be installed for the respective pre-packaged goals.

9. A method for deploying computing infrastructure, comprising integrating computer readable code into a computing system, wherein the code in combination with the computing system is capable of performing a method for managing one or more goals utilizing a user interface, the method comprising:
displaying, in a user interface, a plurality of selectable goal elements, each selectable goal element representing a goal for managing a computer system;
upon selection of a selectable goal element,
displaying, in the user interface, a plurality of building block elements ordered in a predefined sequence of execution for achieving a goal represented by the selected selectable goal element, the plurality of building block elements representing a plurality of tasks for achieving the selected goal; and
displaying a status text field along with each building block element, each status text field describing a function currently being performed by the building block element, wherein the status text field displays a textual indicator of whether the building block element is functioning correctly or requires attention.

10. The method of claim 9, further comprising:
analyzing the computing system;
creating recommendations responsive to the analysis; and
generating computer readable code to implement at least portions of the recommendations.

* * * * *